(12) United States Patent
Xian (10) Patent No.: US 10,845,659 B2
(45) Date of Patent: Nov. 24, 2020

(54) DISPLAY SUBSTRATE AND DISPLAY DEVICE

(71) Applicant: BOE TECHNOLOGY GROUP CO., LTD., Beijing (CN)

(72) Inventor: Jianbo Xian, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 486 days.

(21) Appl. No.: 15/531,698

(22) PCT Filed: Oct. 14, 2016

(86) PCT No.: PCT/CN2016/102123
§ 371 (c)(1),
(2) Date: May 30, 2017

(87) PCT Pub. No.: WO2017/113931
PCT Pub. Date: Jul. 6, 2017

(65) Prior Publication Data
US 2018/0101078 A1    Apr. 12, 2018

(30) Foreign Application Priority Data

Dec. 30, 2015  (CN) .......................... 2015 2 1130131

(51) Int. Cl.
*G02F 1/1362*    (2006.01)
*G02F 1/1345*    (2006.01)
(Continued)

(52) U.S. Cl.
CPC ...... *G02F 1/136286* (2013.01); *G02F 1/1309* (2013.01); *G02F 1/1345* (2013.01);
(Continued)

(58) Field of Classification Search
CPC .. G02F 1/1309; G02F 1/1345; G02F 1/13454; G02F 1/136286; G09G 3/3677; G09G 2300/0408

See application file for complete search history.

(56) References Cited

U.S. PATENT DOCUMENTS 8,587,577 B2   11/2013  Han et al.
2004/0263085 A1*  12/2004  Chen ................... H01L 27/3281
                                                          315/169.1
(Continued)

FOREIGN PATENT DOCUMENTS

CN   100405142 C   7/2008
CN   201828742 U   5/2011
(Continued)

OTHER PUBLICATIONS

International Search Report and Written Opinion in PCT/CN2016/102123 dated Dec. 28, 2016, with English translation.

*Primary Examiner* — Stacy Khoo
(74) *Attorney, Agent, or Firm* — Womble Bond Dickinson (US) LLP (57) ABSTRACT

The present disclosure provides a display substrate and a display device, wherein the positional relationship between the input signal lines and the first internal circuit is changed by disposing the first internal circuit between any two adjacent input signal lines, such that the input signal lines that are all arranged on one side of the first internal circuit before are distributed on two sides of the first internal circuit.

12 Claims, 7 Drawing Sheets

(51) Int. Cl.
  *G02F 1/13* (2006.01)
  *G09G 3/36* (2006.01)
(52) U.S. Cl.
  CPC ....... *G02F 1/13454* (2013.01); *G09G 3/3677* (2013.01); *G09G 2300/0408* (2013.01)

(56) References Cited

U.S. PATENT DOCUMENTS

| | | | |
|---|---|---|---|
| 2005/0179037 A1 | 8/2005 | Fujita | |
| 2006/0022201 A1* | 2/2006 | Kim | G02F 1/1339 257/72 |
| 2009/0184946 A1* | 7/2009 | Ahn | G02F 1/133512 345/206 |
| 2010/0039363 A1* | 2/2010 | Lee | G11C 19/28 345/100 |
| 2011/0085635 A1* | 4/2011 | Koyama | G09G 3/3266 377/78 |
| 2012/0235983 A1 | 9/2012 | Sakamoto et al. | |
| 2013/0027280 A1* | 1/2013 | Ogasawara | G02F 1/13454 345/55 |
| 2013/0113688 A1* | 5/2013 | Choi | G09G 3/3266 345/76 |
| 2014/0232609 A1* | 8/2014 | Lee | H01P 11/00 343/873 |
| 2014/0292628 A1* | 10/2014 | Park | G09G 3/3677 345/100 |
| 2015/0293546 A1* | 10/2015 | Tanaka | H03K 17/04206 327/541 |
| 2015/0332644 A1* | 11/2015 | Fujikawa | G09G 3/3611 345/100 |
| 2016/0035304 A1* | 2/2016 | Zheng | G02F 1/136286 345/211 |

FOREIGN PATENT DOCUMENTS

| | | |
|---|---|---|
| CN | 102393587 A | 3/2012 |
| CN | 103107183 A | 5/2013 |
| CN | 205263423 U | 5/2016 |

* cited by examiner

DISPLAY SUBSTRATE AND DISPLAY DEVICE

RELATED APPLICATION

The present application is the U.S. national phase entry of PCT/CN2016/102123, with an international filing date of Oct. 14, 2016, which claims the benefit of Chinese Patent Application No. 201521130131.8, filed on Dec. 30, 2015, the entire disclosure of which is incorporated herein by reference.

FIELD

The present disclosure relates to the field of display technology, and particularly to a display substrate and a display device.

BACKGROUND

Display devices are widely used in display components, etc of various information processing apparatuses, for example, a liquid crystal display device that uses the liquid crystal as an electro-optical material, which generally include a plurality of internal circuits provided on a display substrate and a plurality of terminals electrically connected to the internal circuits. The internal circuit receives a signal provided by a corresponding input signal line and adjusts an output to a corresponding terminal for operations such as driving, scanning and the like. With the continuous development of a large-sized display panel, the internal circuit is constantly integrated with various functions. Therefore, there is a tendency that the line width of the input signal line that supplies a signal is widened and the number of input signal lines increases.

SUMMARY

Embodiments of the present disclosure provide an improved display substrate and display device. In some embodiments, the display substrate and the display device are capable of overcoming the problem of a delay in signal output resulting from the large cross capacitance generated by the large overlapping region between signal lines.

According to an aspect of the present disclosure, there is provided a display substrate comprising a first internal circuit arranged in a non-display area of the display substrate. The first internal circuit comprises one or more internal elements and at least two input signal lines for providing a preset signal to the internal elements of the first internal circuit. At least one of the internal elements in the first internal circuit is arranged between any two adjacent input signal lines.

With the above-described solution, the first internal circuit is arranged between two adjacent input signal lines, thereby reducing the area of the overlapping region between a connection signal line and the input signal line and improving the signal delay interference caused by the cross capacitance.

According to some embodiments, the display substrate further comprises a second internal circuit arranged in a display area of the display substrate and electrically connected to the first internal circuit.

According to some embodiments, the internal elements in the first internal circuit are all arranged between the same adjacent input signal lines.

With this technical solution, it is possible to reduce the area of the overlapping region between the connection signal line and the input signal line, thereby improving the signal delay interference caused by the cross capacitance.

According to some embodiments, the internal elements in the first internal circuit are respectively adjacent to respective input signal lines.

With the above-described technical solution, it is possible to more effectively reduce or even eliminate the area of the overlapping region between the connection signal line and the input signal line, thereby improving the signal delay interference caused by the cross capacitance.

According to some embodiments, the display substrate further comprises a connection signal line that connects the internal elements to the input signal lines, and the line width of the connection signal line is smaller than those of the input signal lines.

By setting the connection signal line with smaller line width, the area of the overlapping region between the connection signal line and the input signal line is reduced, thereby improving the signal delay interference caused by the cross capacitance.

According to some embodiments, the input signal lines comprise a first input signal line. The first input signal line is closer to the second internal circuit than other input signal lines and the line width of the connection signal line that is connected to the first input signal line is smaller than the line widths of other connection signal lines.

According to some embodiments, the internal elements comprise a first internal element. The first internal element is closer to the second internal circuit than other internal elements and at least one of the input signal lines arranged between the first internal element and the second internal circuit is applied with a fixed voltage signal.

Since the input signal line is applied with a fixed voltage signal, the delay interference to signal transmission can be decreased.

According to some embodiments, the line width of the input signal line applied with a fixed voltage signal is larger than the line width of at least one input signal line applied with a non-fixed voltage signal.

According to some embodiments, the internal elements comprise a first internal element. The first internal element is closer to the second internal circuit than other internal elements. The line width of the input signal line between the first internal element and the second internal circuit is not larger than the line widths of other input signal lines.

By setting the input signal line with smaller line width, the area of the overlapping region is reduced, thereby improving the signal delay interference caused by the cross capacitance.

According to some embodiments, the first internal circuit further comprises a control bus. Control terminals of the internal elements are respectively connected to the control bus, or the control bus serves as the control terminals of the internal elements.

With the above-described connection manner, the interference of the cross capacitance to signal transmission can be decreased, and at the same time, the transmitted signal can be further adjusted and controlled accurately and outputted to respective internal elements in the second internal circuit.

According to some embodiments, the control bus is arranged in the area of the orthographic projection of the first internal circuit on the display substrate.

According to some embodiments, the display substrate further comprises a connection signal line that connects the internal elements to the input signal lines, and a hollow structure is provided at positions where the control bus overlaps the respective connection signal lines in an insulating manner.

With the above-described technical solution, the area of the overlapping region is reduced such that the cross capacitance is reduced, thereby improving the signal transmission delay.

According to some embodiments, the hollow structure is provided on either or both of the control bus and the connection signal line.

According to some embodiments, the first internal circuit further comprises one or more control lines. The control terminals of the internal elements are connected to respective control lines via control leads, respectively, or the control lines serve as the control terminals of the internal elements.

With the above-described connection manner, the interference of the cross capacitance to signal transmission can be decreased, and at the same time, the transmitted signal can be further adjusted and controlled accurately and outputted to respective internal elements in the second internal circuit.

According to some embodiments, the control terminals of the internal elements are respectively connected to at least any one of the input signal lines as the control bus via respective control leads.

With the above-described connection manner, the interference of the cross capacitance to signal transmission can be decreased, and at the same time, the transmitted signal can be further adjusted and controlled accurately and outputted to respective internal elements in the second internal circuit.

According to some embodiments, the display substrate further comprises a connection signal line that connects the internal element to the input signal lines, wherein a hollow structure is provided at positions where at least a portion of the input signal lines overlap the connection signal line. The hollow structure is provided on either or both of the input signal line and the connection signal line.

With the above-described technical solution, the area of the overlapping region is reduced such that the cross capacitance is reduced, thereby improving the signal transmission delay.

According to some embodiments, the first internal circuit is a test switch circuit or a gate driving (GOA) circuit or a discharge circuit.

According to some embodiments, the first internal circuit is a test switch circuit, and the internal elements comprise one or more thin film transistors. The internal circuit further comprises a control bus. The control terminals of the thin film transistors are respectively connected to the control bus via control leads, or the control bus serves as the control terminals of the thin film transistors.

According to some embodiments, the first internal circuit is a GOA circuit, and the internal element comprises one or more GOA units. At least one of the input signal lines arranged between the GOA circuit and the second internal circuit is applied with a fixed voltage signal.

According to another aspect of the present disclosure, there is provided a display device comprising any of the above-described display substrates.

With the above-described solutions, the area of the overlapping region at bridging structure between signal lines can be reduced, so that the cross capacitance is reduced, thereby improving the signal transmission delay.

BRIEF DESCRIPTION OF DRAWINGS

In order to illustrate the technical solutions in embodiments of the present disclosure more clearly, the drawings, which are required to describe the embodiments, will be briefly introduced below. Clearly, the drawings described below are merely some embodiments of the present disclosure. Those ordinarily skilled in the art can further obtain other drawings in accordance with these drawings without spending inventive efforts.

FIGS. 4 (a) and 4 (b) are respectively schematic views showing the structures of display substrates according to embodiments of the present disclosure;

FIGS. 5 (a) to 5 (c) are respectively schematic views showing the structures of display substrates according to the present disclosure;

FIGS. 6 (a) and 6 (b) are respectively schematic views in which the line width of the connection signal line in the display substrate shown in FIG. 4 (b) is smaller than the line widths of respective input signal lines;

FIGS. 7 (a) and 7 (b) are a schematic view showing the structure of a display substrate provided by embodiments of the present disclosure and a simplified equivalent circuit diagram respectively;

FIGS. 9 (a) and 9 (b) are a schematic view showing the structure of a display substrate provided by embodiments of the present disclosure and a simplified equivalent circuit diagram respectively;

FIGS. 10 (a) and 10 (b) are a schematic view showing the structure of a display substrate provided by embodiments of the present disclosure and a simplified equivalent circuit diagram respectively;

DETAILED DESCRIPTION

To make the objectives, technical solutions and advantages of the present disclosure clearer, the present disclosure will be further described in more detail below with reference to the accompanying drawings. It is obvious that the described embodiments are merely part of the embodiments of the present disclosure, rather than all of them. All other embodiments obtained by those ordinarily skilled in the art without spending inventive efforts based on the embodiments in the present disclosure pertain to the protection scope of the present disclosure.

Figure 1:
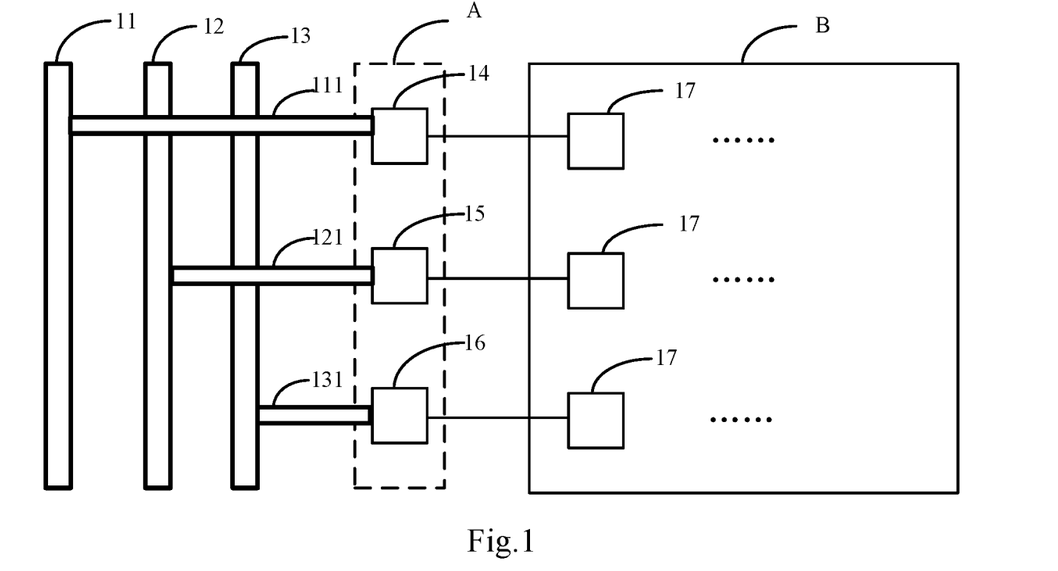
FIG. 1 is a schematic view showing wiring of a typical display substrate.

FIG. 1 illustrates a schematic view of wiring of a typical display substrate. As shown in FIG. 1, a scan inspection line includes three input signal lines, which are an input signal line 11, an input signal line 12, and an input signal line 13, respectively. A first internal circuit A comprises an inner element 14, an inner element 15, and an inner element 16. A second internal circuit B comprises a plurality of internal elements 17 as output terminals. The input signal lines 11, 12, 13 are connected to the first internal circuit A via respective connection signal lines 111, 121, 131, respectively. The internal elements 14, 15, 16 in the first internal circuit A are connected to the second internal circuit B via output signal lines, respectively, which further drive or inspect the respective internal elements in the second internal circuit B.

In FIG. 1, although the connection signal line 111 connected to the input signal line 11 is not in contact with the input signal line 12 and the input signal line 13, but presents a bridging structure, since the line widths of respective input signal lines are relatively large, the connection signal line 111 has a large overlapping region with the input signal line 12 and the input signal line 13, respectively. Similarly, the connection signal line 121 also has an overlapping region with the input signal line 13. Cross capacitances of these overlapping regions are large, which result in a delay in signal transmission, and rise and decline of signals within expected time would not be ensured.

In view of the above, in embodiments of the present disclosure, it is proposed to arrange the first internal circuit between two adjacent input signal lines, so as to at least partially reduce of the bridging structures between the input signal lines and the connection signal lines, i.e. at least partially reducing the area of the overlapping regions between the connection signal lines and other input signal lines, thereby reducing the cross capacitance caused by the overlapping region. As a result, the delay interference of the cross capacitance to signal transmission is decreased to some extent and the display effect is improved.

The technical solutions involved in the present disclosure are described below in more detail on the basis of specific embodiments. The present disclosure includes but is not limited to the following embodiments.

Figure 2:
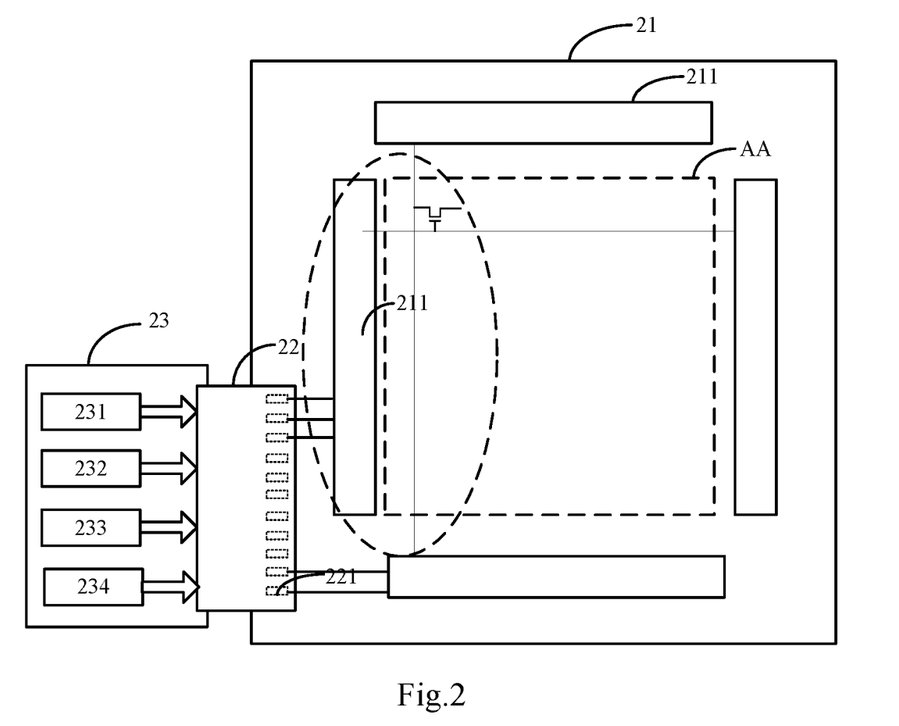
FIG. 2 is a schematic view showing the structure of a display device provided by the present disclosure.

A display substrate according to an embodiment of the present disclosure is shown in FIG. 2, and the integral structure of FIG. 2 is described on the basis of a liquid crystal display device in this embodiment of the present disclosure. Of course, the display substrate may also be applied to other embodiments of the present disclosure. As shown in FIG. 2, the liquid crystal display device comprises a display substrate 21. The display substrate 21 is defined as comprising a display area AA including a plurality of pixel units and a non-display area (an area of the display substrate outside the area enclosed by the rectangular dashed line frame as shown in FIG. 2) in which signal lines are provided. The liquid crystal display device further comprises a flexible substrate 22 and an external substrate 23 as mounting members. The external substrate 23 comprises a signal inspection circuit 231, a power supply driving circuit 232, an image processing circuit 233, and a clock control circuit 234. The circuits in the external substrate 23 can be operated by supplying an external voltage signal. The circuits in the external substrate 23 can supply a required signal, such as a control signal, a power supply signal, and the like, to the display substrate 21 via a terminal set 221 of the flexible substrate 22 which is connected to the display substrate 21. A control circuit 211 is provided in the non-display area of the display substrate 21. The control circuit 211 may receive a control signal or a power supply signal from the external substrate 23 so as to realize driving of the scanning line, signal detection of the pixel circuit, or clock control of the pixel circuit.

Figure 3:
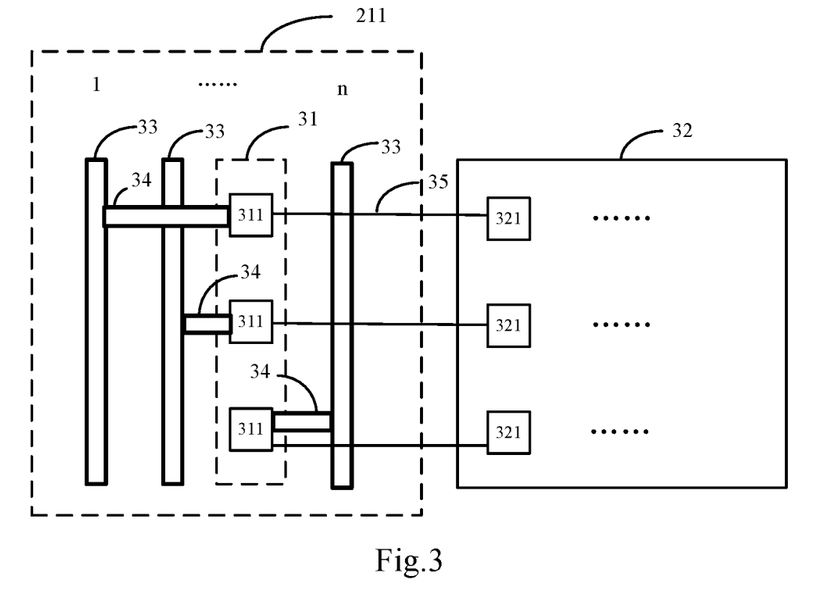
FIG. 3 is a partial enlarged schematic view of the elliptical region in FIG. 2.

FIG. 3 is a partial enlarged view of the elliptical region in FIG. 2. As shown in FIG. 3, the display substrate mainly comprises a first internal circuit 31 arranged in the non-display area of the display substrate, a second internal circuit 32 arranged in the display area of the display substrate, and at least two input signal lines 33 for transmitting a preset signal. The control circuit 211 may comprise a first internal circuit 31 and at least two input signal lines 33 (n input signal lines 33 are shown in the figure, n being an integer greater than or equal to 2). The input signal lines 33 are connected to a corresponding internal element 311 in the first internal circuit 31 via a corresponding connection signal line 34, the internal element 311 in the first internal circuit 31 is connected to a corresponding internal element 321 in the second internal circuit 32 via an output signal line 35, and at least one internal element in the first internal circuit 31 is arranged between any two adjacent input signal lines 33.

With the above setting, the first internal circuit 31 is disposed at an interval between two adjacent input signal lines 33. The positional relationship between the input signal line and the first internal circuit is changed so that the input signal lines that are all arranged at one side of the first internal circuit (the side of the first internal circuit that is away from the second internal circuit, as shown in FIG. 1) before are distributed at two sides of the first internal circuit, which at least partially reduces the bridging structures between the input signal lines and the connection signal lines, i.e. at least reducing the area of the overlapping regions between the connection signal line and other input signal lines, thereby reducing the cross capacitance generated by the overlapping region. As a result, the delay interference of the cross capacitance to signal transmission is decreased to some extent, and the display effect is improved.

Figure 4A:
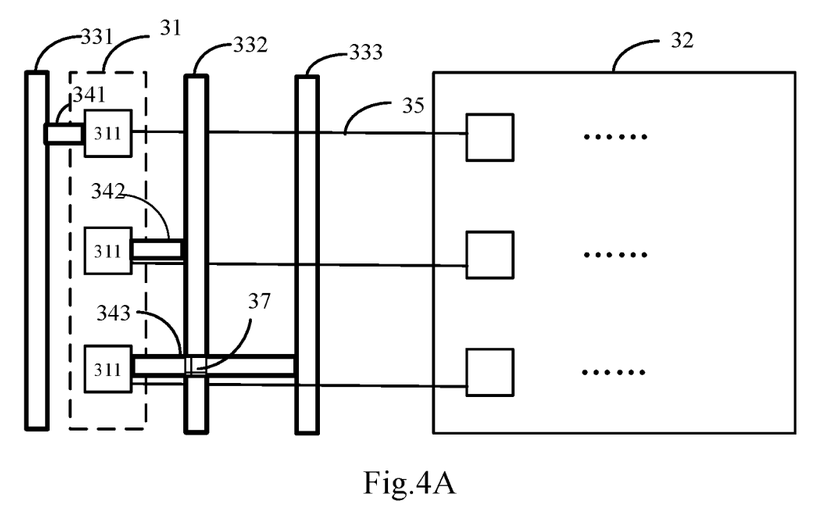
Figure 4B:
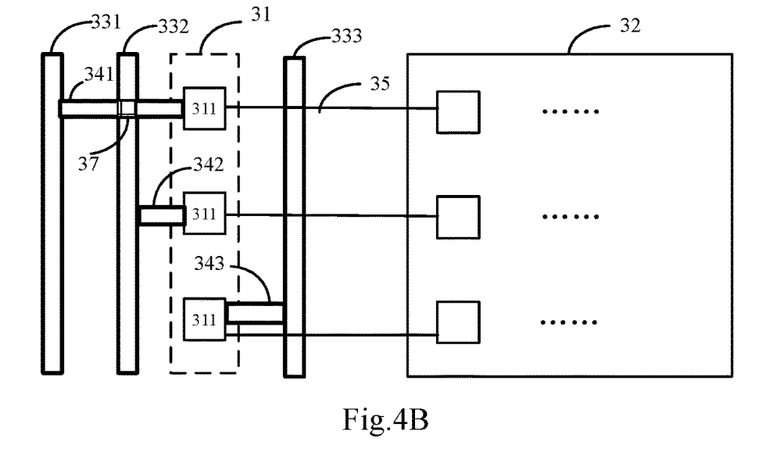

In an exemplary embodiment, the internal elements in the first internal circuit are all arranged at an interval between same adjacent input signal lines. As shown in FIGS. 4 (a) and 4 (b), on the basis of the example that the display substrate is provided with three input signal lines: a first input signal line 331, a second input signal line 332, and a third input signal line 333, the three internal elements 311 in the first internal circuit 31 are all arranged at an interval between the first input signal line 331 and the second input signal line 332 (as shown in FIG. 4 (a)). Alternatively, the internal elements 311 in the first internal circuit 31 are all arranged at an interval between the second input signal line 332 and the third input signal line 333 (as shown in FIG. 4 (b)). The respective internal elements 311 are connected to the first input signal line 331 via a first connection signal line 341, connected to the second input signal line 332 via a second connection signal line 342, and connected to the third input signal line 333 via a third connection signal line 343, respectively, and then transmit signals to corresponding internal elements in the second internal circuit 32.

It can be seen that, with either solution shown in FIG. 4 (a) or 4 (b), it is possible to at least partially reduce the bridging structures 37 (the square area as shown in FIG. 4 (a) or 4 (b)) between the input signal lines and the connection signal lines. The bridging structure is arranged at an intersection of the input signal line with the connection signal line which is not electrically connected thereto, wherein the upper and lower positional relationship between the input signal line and the connection signal line are interchangeable. Specifically, in connection with the arrangement scheme shown in FIG. 1, the connection signal line 111 connected to the input signal line 11 has two bridging structures with the input signal line 12 and the input signal line 13, and the connection signal line 121 connected to the input signal line 12 has one bridging structure with the input signal line 13. In embodiments of the present disclosure, in the case of the arrangement scheme of FIG. 4 (a), there is only one bridging structure between the input signal line and the connection signal line, which reduces the area of the overlapping regions between the connection signal line and other input signal lines compared with the arrangement scheme in FIG. 1, and further reduces the cross capacitance generated by the overlapping region. As a result, the delay interference of the cross capacitance to signal transmission is decreased to some extent and the display effect is improved. Similarly, the arrangement scheme of FIG. 4 (b) can also achieve the same technical results, which is not described here for simplicity. In addition, when the number of input signal lines is greater than 3, an appropriate interval can be selected for the first internal circuit based on the actual situation so as to achieve an optimum effect.

Figure 5A:
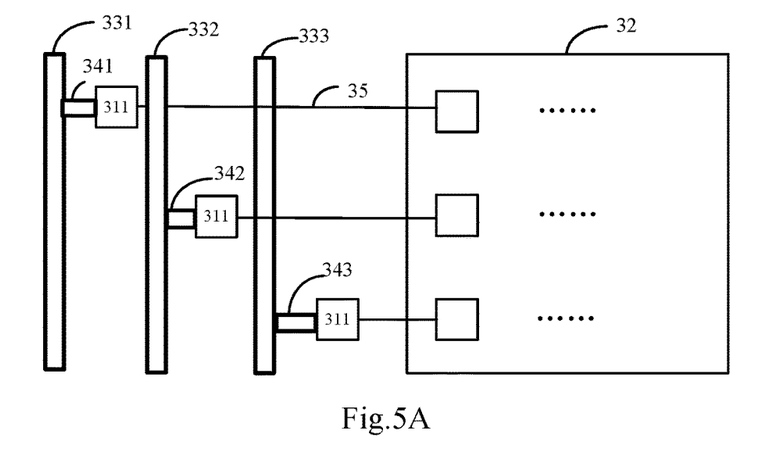
Figure 5B:
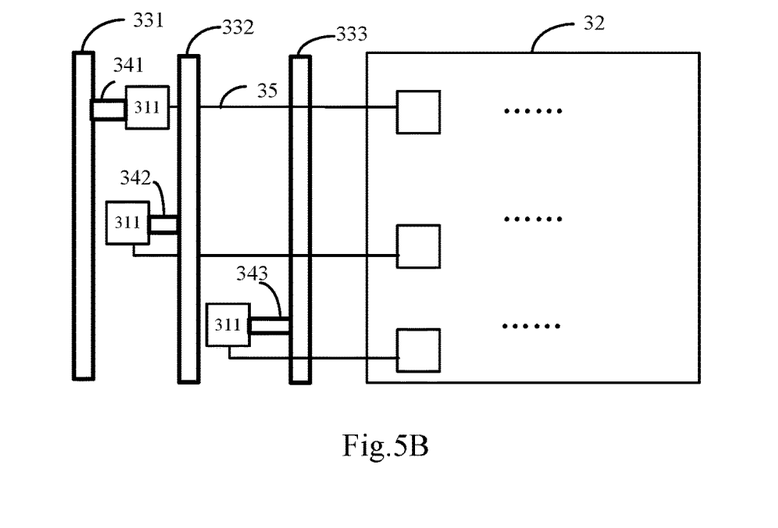
Figure 5C:
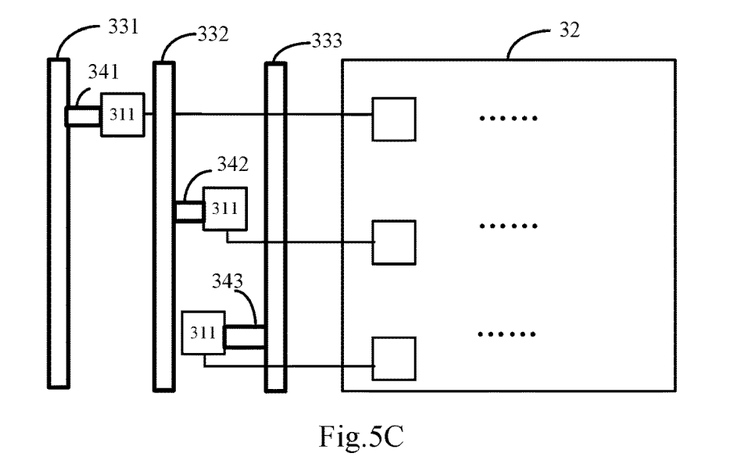

In another exemplary embodiment, the internal elements in the first internal circuit are adjacent to the respective input signal lines respectively. As shown in FIGS. 5 (a), 5 (b) and 5 (c), also taking three input signal lines: a first input signal line 331, a second input signal line 332, and a third input signal line 333 as an example, the three internal elements in the first internal circuit 31 are arranged at an interval between the first input signal line 331 and the second input signal line 332, an interval between the second input signal line 332 and the third input signal line 333, and an interval between the third input signal line 333 and the second internal circuit 32, respectively (as shown in FIG. 5 (a)). Alternatively, two internal elements in the first internal circuit 31 are arranged at an interval between the first input signal line 331 and the second input signal line 332, and the other internal element is arranged at an interval between the second input signal line 332 and the third input signal line 333 (as shown in FIG. 5 (b)). Alternatively, one of the internal elements in the first internal circuit 31 is arranged at an interval between the first input signal line 331 and the second input signal line 332, and the other two internal elements are arranged at an interval between the second input signal line 332 and the third input signal line 333 (as shown in FIG. 5 (c)). The respective internal elements 311 are connected to the first input signal line 331 via the first connection signal line 341, connected to the second input signal line 332 via the second connection signal line 342, and connected to the third input signal line 333 via the third connection signal line 343, respectively.

With the solutions of FIGS. 5 (a) to 5 (c), it is possible to better prevent a bridging structure from being generated between a connection signal line and other input signal lines, which more effectively reduces or even eliminates the area of the overlapping region to avoid the cross capacitance generated by the overlapping region, thereby effectively decreasing the delay interference of the cross capacitance to signal transmission and improving the display effect.

It is to be noted that the input signal line and the connection signal line in embodiments of the present disclosure may be made of the same material or different materials. The input signal line and the connection signal line are arranged in different layers at the position of the bridging structure, and may be in the same layer or different layers at other positions. For example, the input signal line is a gate line layer, and the connection signal line is a data line layer or a pixel electrode layer. Similarly, in embodiments of the present disclosure, the output signal lines and the input signal lines that establish connections between the internal elements in the second internal circuit and the internal elements in the first internal circuit may be made of the same material or different materials. The output signal line and the input signal line are arranged in different layers at the position of the bridging structure, and may be in the same layer or in different layers at other positions.

In an exemplary embodiment, all the input signal lines are arranged in the same layer and are formed with the same material. For example, all the input signal lines are in the same layer as the gate lines and have the same material as the gate lines. The material of the gate lines may be Al, Mo, Cu, or an alloy thereof.

In another exemplary embodiment, all the connection signal lines are arranged in the same layer and are formed with the same material. For example, all the connection signal lines are in the same layer as the data lines and have the same material as the data lines. The material of the data lines may be Al, Mo, Cu, or an alloy thereof.

In a further exemplary embodiment, the input signal line is connected to a corresponding connection signal line via a via hole. The via hole is filled with a conductive material for establishing an electrical connection between the input signal line and the corresponding connection signal line. The conductive material may be ITO, IZO and so on.

Figure 6A:
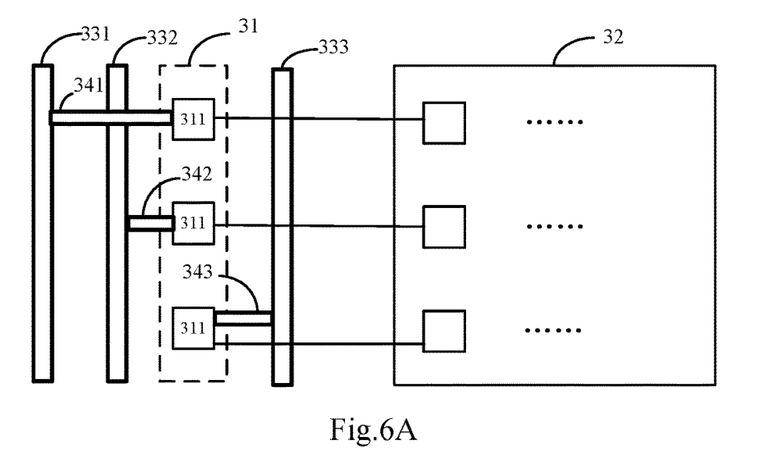
Figure 6B:
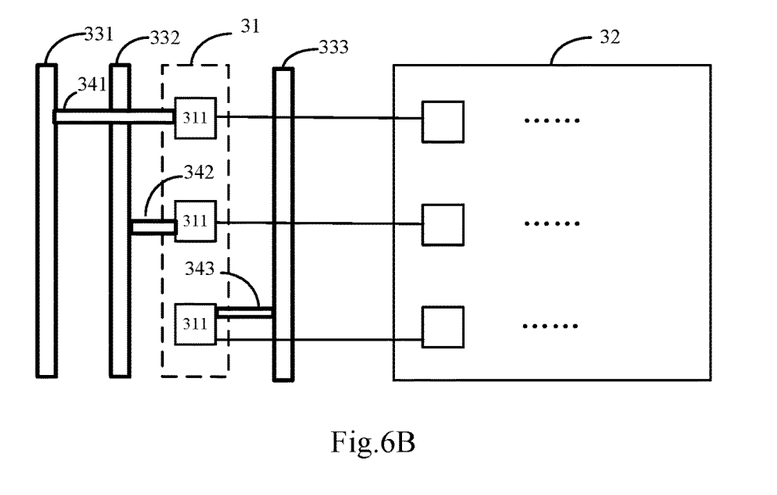

In specific embodiments, the line width of the connection signal line may be smaller than the line width of the input signal line. As shown in FIG. 6 (a), the line widths of the first connection signal line 341, the second connection signal line 342, and the third connection signal line 343 are equal to each other and smaller than the line widths of the input signal lines 331, 332, 333. Alternatively, as shown in FIG. 6 (b), the line widths of the first connection signal line 341, the second connection signal line 342, and the third connection signal line 343 are not equal and are all smaller than the line widths of the input signal lines 331, 332, 333. For example, as shown in FIG. 6 (b), the line width of the connection signal line 343 connected to the input signal line 333 close to the second internal circuit 32 is smaller than the line widths of other connection signal lines 341, 342.

Optionally, the internal element comprises a first internal element. The first internal element is close to the second internal circuit and at least one input signal line arranged between the first internal element and the second internal circuit is applied with a fixed voltage signal. It is to be understood that the fixed voltage signal maintains a relatively constant voltage but does not always maintain an absolutely constant voltage. For example, the fixed voltage signal is VSS or VGH and so on.

Optionally, the line width of the input signal line applied with a fixed voltage signal larger than the line width of at least one input signal line applied with a non-fixed voltage signal. For example, the applied fixed voltage signal may be a Vss signal, and the non-fixed voltage signal may be a square wave voltage for inspection, or a clock signal voltage. The fixed voltage signal can reduce the voltage fluctuation of the connection signal line or the like that bridges the input signal line, and at the same time, can further reduce the voltage fluctuation of the output signal line between the first internal circuit and the second internal circuit, thereby decreasing the interference to signal transmission.

Optionally, the internal element comprises a first internal element. The first internal element is close to the second internal circuit. The line width of the input signal line between the first internal element and the second internal circuit is not larger than the line widths of the other input signal lines. This arrangement can reduce the overlapping area between the output signal line of the first internal circuit and the input signal line arranged between the first internal element and the second internal circuit, thereby decreasing the interference to signal transmission.

Alternatively, in embodiments of the present disclosure, the first internal circuit may be a test switch circuit, a GOA circuit, or a discharge circuit. Correspondingly, the internal elements in the first internal circuit may include one or more combinations of multiple electronic elements such as a thin film transistor, a diode, a capacitive element, a resistive element, and the like, and may also include connection lines between multiple electronic elements, and so on. The specific type of the first internal circuit is not limited in the present disclosure. The second internal circuit may include one or more combinations of multiple electronic elements such as a gate line, a data line, a common electrode line, a thin film transistor, a diode, a capacitive element, a resistive element, and the like in the display area, and may also include connection lines between multiple electronic elements, and so on. The specific type of the second internal circuit is not limited in the present disclosure.

Of course, the first internal circuit in embodiments of the present disclosure may be arranged on the gate line side and/or the data line side of the display substrate. There may also be a plurality of first internal circuits, and the plurality of first internal circuits may be arranged on the same side or different sides of the display substrate. The specific position of the first internal circuit is not limited in the present disclosure.

It is to be understood that the second internal circuit in embodiments of the present disclosure may be part or all of the circuit of the display substrate.

The structure and the connection relation of the first internal circuit will be described below, taking the structure in the solution shown in FIG. 4 (b) as an example.

Figure 7A:
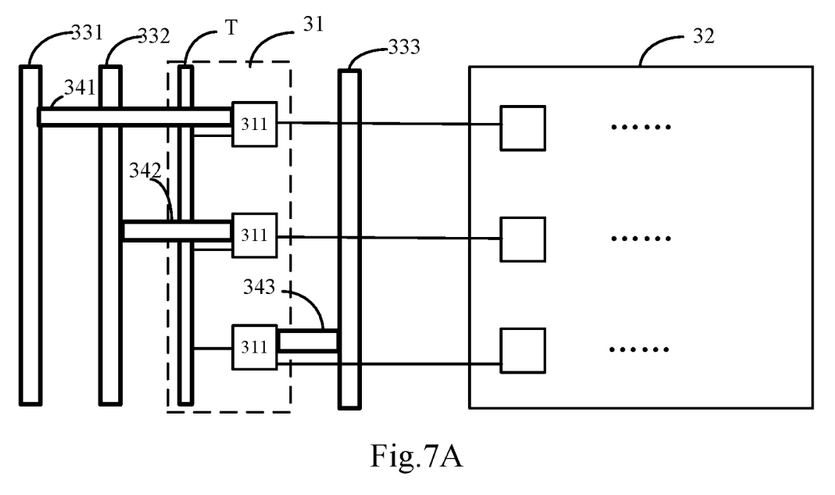
Figure 7B:
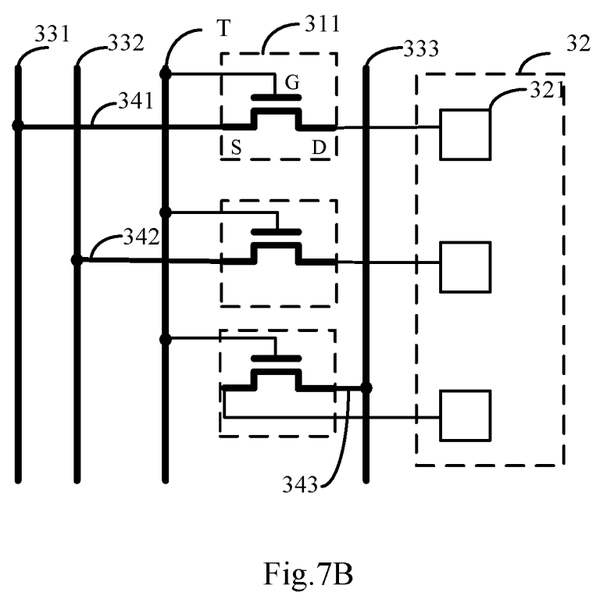

As shown in FIG. 7 (a), the first internal circuit 31 further comprises a control bus T. The control bus T extends in the same direction as the input signal line. With reference to the equivalent circuit diagram shown in FIG. 7 (b), control terminals G of the internal elements 311 in the first internal circuit 31 are connected to the control bus T via control leads, input terminals S of the internal elements 311 in the first internal circuit 31 are connected to the first input signal line 331, the second input signal line 332, and the third input signal line 333 via the first connection signal line 341, the second connection signal line 342, and the third connection signal line 343, respectively, and output terminals D of the internal elements 311 in the first internal circuit 31 are connected to the respective internal elements 321 in the second internal circuit 32 via the output signal lines, respectively. Alternatively, the control bus serves as the control terminal of the internal elements.

It is to be noted that the control lead referred to in the present disclosure may be understood as a connection line for connecting the control terminal of an internal element to the control bus, which may specifically be a wire or a signal line, or a connection signal line described in the present disclosure.

FIGS. 7 (a) and 7 (b) make improvement to the positions of the first internal circuit and the input signal lines based on the above embodiment. With such structure, not only control of the second internal circuit is realized by a test switch circuit, but also the delay interference of the cross capacitance to signal transmission is decreased and the display effect is improved.

Alternatively, considering in the structure shown in FIG. 7 (a), there is a bridging structure between the control bus T and the connection signal line, in order to further reduce the area of the overlapping region, a hollow structure (not shown) is provided at a position where the control bus T and the connection signal line overlap each other in an insulating manner. The specific shape of the hollow structure is not limited, which may be rectangular, circular, or triangular, and the like, and the hollow structure may also be reticular or lattice-like. In addition, the hollow structure may be a hollow structure formed by the control bus T at the insulating overlapping position, and may also be a hollow structure formed by the connection signal line at the insulating overlapping position; or both of the control bus and the connection signal line simultaneously form part of the hollow structure at the insulating overlapping position.

Figure 8:
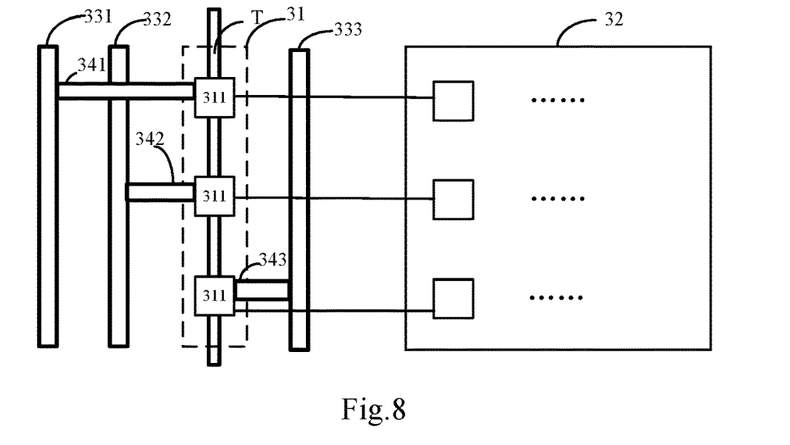
FIG. 8 is a schematic view showing the structure of a display substrate provided by embodiments of the present disclosure.

FIG. 8 is a schematic view showing the structure of a display substrate provided by embodiments of the present disclosure. As shown in FIG. 8, the control bus T is arranged in the area of the orthographic projection of the first internal circuit 31 on the display substrate. It is to be noted that the equivalent circuit diagram of the display substrate as shown in FIG. 8 is similar to FIG. 7 (b). With reference to FIGS. 7 (b) and 8, for the first internal circuit 31, the control terminal G of the internal element 311 may be formed on the control bus T, that is, the control bus T serves as the control terminal G of the internal element 311, and the connection structures of the input terminal S and the output terminal D are the same as those in FIG. 7 (b); or the control terminal G of the internal element 311 in the first internal circuit 31 is connected to the control bus T via a via hole, and the connection structures of the input terminal S and the output terminal D are the same as those in FIG. 7 (b), which are not described here for simplicity. As can be known from FIG. 8, the bridging structures between the control bus T and the connection signal lines are reduced as compared to FIGS. 7 (a) and 7 (b), so that the area of the overlapping region is reduced effectively, thereby decreasing the delay interference of the cross capacitance to signal transmission and improving the display effect.

Figure 9A:
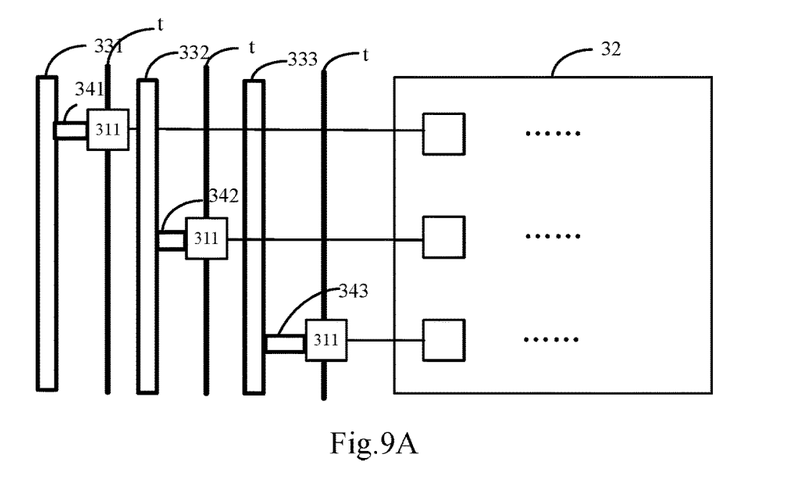

The structure and the connection relation of the first internal circuit will be described below, taking the structure in the solution shown in FIG. 9 (a) as an example.

Figure 9B:
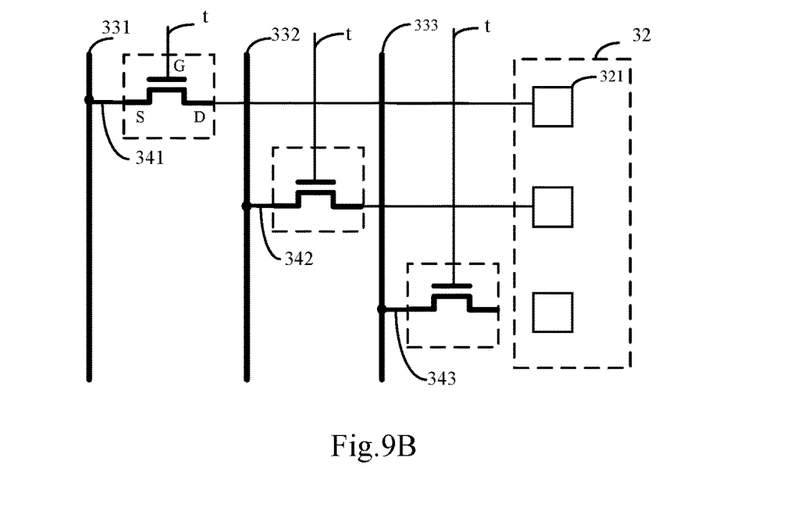

As shown in FIG. 9 (a), the first internal circuit 31 further includes a plurality of control lines t, wherein the control line t extends in the same direction as the input signal line. With reference to the equivalent circuit diagram shown in FIG. 9 (b) corresponding to FIG. 9 (a), the control terminals G of the internal elements 311 in the first internal circuit 31 are connected to a corresponding control line t via a control lead or a via hole; or the control line t serves as the control terminal G of the internal element 311 (wherein FIG. 9 (a) only shows the solution where the connection is achieved via a via hole; in the solution where the connection is achieved by the input signal line, the control line t may be staggered from the internal element by a certain distance and arranged in the range where it does not overlap the connection signal line). Input terminals S are connected to the first input signal line 331, the second input signal line 332, and the third input signal line 333 via respective connection signal lines, respectively, and output terminals D are connected to the internal element 321 in the second internal circuit 32 via the output signal line.

With the structures shown in FIGS. 9 (a) and 9 (b), it is not only possible to avoid the bridging structure as much as possible such that the delay interference of the cross capacitance to signal transmission is decreased, but also possible to use a plurality of control lines to provide control signals to the internal elements of the first internal circuit, which facilitates independent control of the internal elements and is easy to control and operate.

Figure 10A:
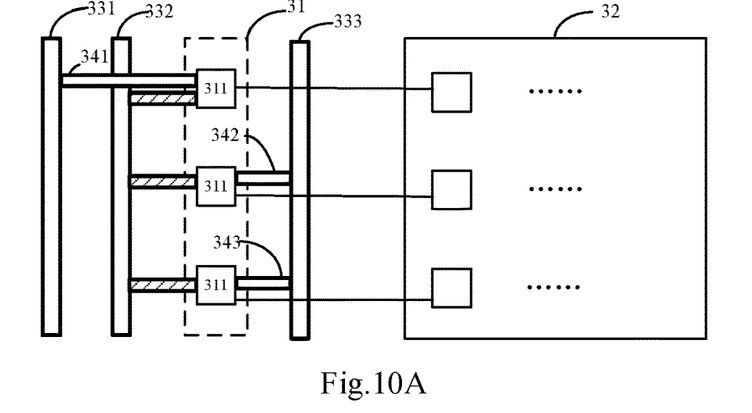
Figure 10B:
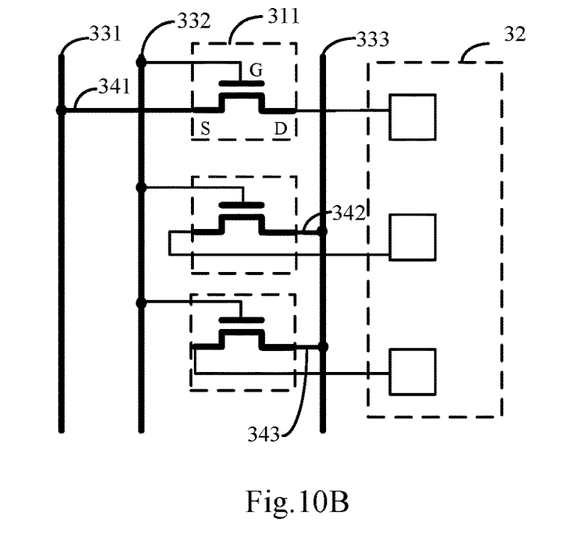

In a further exemplary embodiment, there is no need to provide an additional control bus or control line, but any one of the input signal lines is used as the control bus. Specifically, as shown in FIG. 10 (a), taking use of the second input signal line 332 as a control bus as an example, and referring to the equivalent circuit diagram shown in FIG. 10 (b), the control terminals G of the respective internal elements 311 in the first internal circuit 31 are connected to the second input signal line 332 via corresponding control leads (which are connection signal lines shown by oblique lines in FIG. 10 (a)). The input terminal of the first internal element 311 is connected to the first input signal line 331 via the first connection signal line 341, and the input terminals of the second internal element 311 and the third internal element 311 are connected to the third input signal line 333 via the second connection signal line 342 and the third connection signal line 343, respectively.

With the structures shown in FIGS. 10 (a) and 10 (b), it is not necessary to additionally add a control bus or a plurality of control lines, that is, control signals can be provided for the internal elements in the test switch circuit, so that the circuit structure is simplified while effectively decreasing the delay interference of the cross capacitance to signal transmission.

Optionally, in exemplary embodiments of the present disclosure, a hollow structure is provided at each position where the input signal line and the connection signal line overlap each other in an insulating manner. Such hollow structure is the same as the hollow structure formed by the control bus with the connection signal line, which may refer to the above-described hollow structure and is not described here for simplicity.

The first internal circuit may be a test switch circuit for testing whether there is a line failure in a data line, a gate line, and a common electrode line. For example, taking FIGS. 7 (a) and 7 (b) as an example, the first internal circuit may be a test switch circuit for testing a data line. The control bus T is connected to the control terminals of the internal elements 311 of the first internal circuit 31, respectively, thereby inputting a turn-on voltage of the internal element 311 of the first internal circuit 31. The internal elements 311 are connected to data lines of a red pixel (R), a green pixel (G) and a blue pixel (B) of the display area, respectively. The first input signal line 331 is connected to the red pixel (R) via the internal element 311, the second input signal line 332 is connected to the green pixel (G) via the internal element 311, and the third input signal line 333 is connected to the blue pixel (B) via the internal element 311. When the control bus T inputs a turn-on voltage of the internal element 311 of the first internal circuit 31 and the input signal line inputs a test signal, it is possible to test whether there is a line failure in the data line in the display area which is correspondingly connected to the input signal line. Of course, the first internal circuit may also be used as other circuits, such as a discharge circuit, a GOA circuit, or the like.

The following description is based on the example that the first internal circuit is a GOA circuit.

Figure 11:
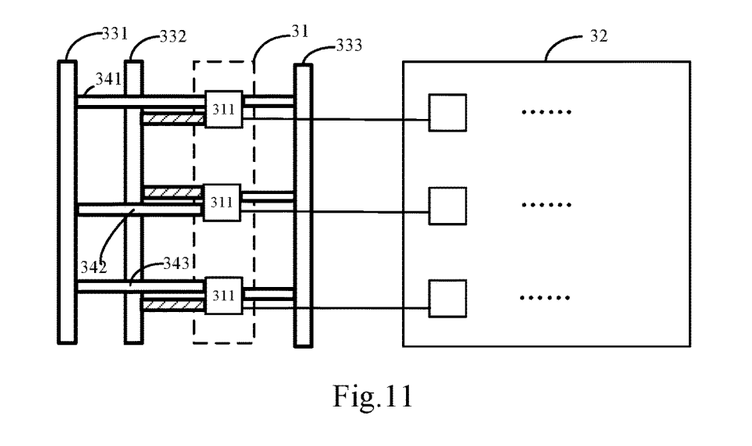
FIG. 11 is a schematic view showing the structure of a display substrate provided by embodiments of the present disclosure.

As shown in FIG. 11, the first internal circuit 31 is a GOA circuit (or referred to as a gate driving circuit) which comprises a plurality of internal elements 311 as gate driving units (i.e. GOA units, wherein the GOA units may include a plurality of TFTs and other signal lines such as a trigger signal line STV, which are not shown here). The first input signal line 331 is used for transmitting a first clock signal, the second input signal line 332 is used for transmitting a second clock signal, and the third input signal line 333 is used for transmitting a fixed voltage signal (e.g. a high level signal VHG, a low level signal VSS). Specifically, the first input signal line 331 are connected to the respective internal elements 311 via the first connection signal line 341, the second connection signal line 342, and the third connection signal line 343, respectively and provides a first clock signal for the internal elements 311. The second input signal line 332 is connected to the respective internal elements 311 via corresponding connection signal lines (shown by shadows), respectively and provides a second clock signal for the internal elements 311. The third input signal line 333 is connected to the respective internal elements 311 via corresponding connection signal lines, respectively and provides a fixed voltage signal for the internal elements 311. The internal elements 311 output a voltage signal to the internal elements of the second internal circuit via corresponding output signal lines, respectively.

In the case that the first internal circuit is a GOA circuit, with the structure shown in FIG. 11, not only the bridging structure between the input signal line and the connection signal line is reduced such that the delay interference of the cross capacitance to signal transmission is decreased, but also different control signals can be provided for the internal elements of the first internal circuit by the input signal lines respectively, such that control of the internal elements of the second internal circuit is realized effectively via the GOA units. It is to be understood that, the above-described embodiment is merely described based on the example of a brief schematic view of the GOA circuit, but as will be appreciated by those skilled in the art, the structure shown in FIG. 11 is also applicable to other GOA circuits not shown.

Embodiments of the present disclosure further provide a display device comprising the display substrate according to any of the embodiments described above.

It is to be noted that the display device claimed in embodiments of the present disclosure may be a liquid crystal display device, an electronic paper, an organic electroluminescent display device, or the like.

While the exemplary embodiments of the present disclosure have been described, those skilled in the art can make further variations and modifications to these embodiments upon learning the basic inventive concept. Accordingly, the appended claims are intended to be interpreted as including the exemplary embodiments and all variations and modifications that fall within the scope of the present disclosure.

Apparently, those skilled in the art can make various modifications and variations to the present disclosure without departing from the spirit and scope thereof. In this way, if these modifications and variations to the present disclosure pertain to the scope of the claims of the present disclosure and equivalent technologies thereof, the present disclosure also intends to encompass these modifications and variations.

The invention claimed is:

1. A display substrate comprising:
a first internal circuit arranged in a non-display area of the display substrate, the first internal circuit comprising one or more internal elements, and
at least two input signal lines for providing a preset signal to the internal elements of the first internal circuit,
wherein the one or more internal elements in the first internal circuit are all arranged between two adjacent input signal lines, and the first internal circuit is connected to both of the two adjacent input signal lines,
wherein the internal elements comprise a thin film transistor, the first internal circuit further comprises a control bus, a control terminal of the thin film transistor is connected to the control bus, and an orthographic projection of the control bus on the display substrate partially overlap with an orthographic projection of the thin film transistor on the display substrate, wherein the display substrate further comprises a connection signal line connecting each of the internal elements with each of the input signal lines, and at least one of the control bus and the connection signal line comprises a hollow structure, the hollow structure is located within an overlapped region between the control bus and the connection signal line, the control bus and the connection signal line are insulated from each other at the overlapped region.

2. The display substrate according to claim 1, further comprising a second internal circuit arranged in a display area of the display substrate and electrically connected to the first internal circuit.

3. The display substrate according to claim 2, wherein a line width of the connection signal line is smaller than a line width of each of the input signal lines.

4. The display substrate according to claim 3, wherein the input signal lines comprise a first input signal line, the first input signal line being closer to the second internal circuit than other input signal lines, a line width of a connection signal line connected to the first input signal line being smaller than line widths of other connection signal lines.

5. The display substrate according to claim 2, wherein the first internal circuit is selected from a group comprising a test switch circuit, a gate driving circuit and a discharge circuit.

6. The display substrate according to claim 5, wherein the first internal circuit is the test switch circuit, the internal elements comprise one or more thin film transistors, and control terminals of the thin film transistors are connected to the control bus via control leads respectively.

7. The display substrate according to claim 5, wherein the first internal circuit is the gate driving circuit, the internal elements comprise one or more gate driving units, at least one of the input signal lines arranged between the gate driving circuit and the second internal circuit is applied with a fixed voltage signal.

8. The display substrate according to claim 1, wherein the internal elements in the first internal circuit are adjacent to corresponding input signal lines respectively.

9. The display substrate according to claim 1, wherein the control bus is arranged in an area of an orthographic projection of the first internal circuit on the display substrate.

10. The display substrate according to claim 1, wherein control terminals of the internal elements are connected to at least one of the input signal lines as the control bus via corresponding control leads respectively.

11. A display device comprising the display substrate according to claim 1.

12. A display substrate comprising:
a first internal circuit arranged in a non-display area of the display substrate, the first internal circuit comprising one or more internal elements;
at least two input signal lines for providing a preset signal to the internal elements of the first internal circuit, and
a second internal circuit arranged in a display area of the display substrate and electrically connected to the first internal circuit,
wherein at least one of the internal elements in the first internal circuit is arranged between two adjacent input signal lines,
wherein the internal elements comprise a thin film transistor, the first internal circuit further comprises a control bus, a control terminal of the thin film transistor is connected to the control bus, and an orthographic projection of the control bus on the display substrate partially overlap with an orthographic projection of the thin film transistor on the display substrate,
wherein the display substrate further comprises a connection signal line connecting each of the internal elements with each of the input signal lines, and at least one of the control bus and the connection signal line comprises a hollow structure, the hollow structure is located within an overlapped region between the control bus and the connection signal line, the control bus and the connection signal line are insulated from each other at the overlapped region.

* * * * *